United States Patent Office 3,115,525 Patented Dec. 24, 1963

1

3,115,525
HALOGEN-SUBSTITUTED AMIDOXIMES

Giorgio D'Alo, Milan, Italy, assignor to A. Wassermann S.p.A. Societa Italiana per Specialita Farmaco-Terapeutiche, Milan, Italy
No Drawing. Filed Apr. 21, 1960, Ser. No. 23,609
3 Claims. (Cl. 260—564)

Benzamidoximes substituted by a halogen atom in their nucleus, more particularly o-chloro-, m-chloro- and p-chlorobenzamidoxime are known from the literature (Werner and Bloch, Ber. 32, 1979 (1899); Andrews, King and Walker, Proc. Roy. Soc. 133 B, 20 (1946); Clarke, J. Chem. Soc. 1954, 4251).

They are prepared by interaction of their corresponding benzonitrile and hydroxylamine hydrochlorate in the presence of a base, or by reacting benzhydroxamic chloride and liquid ammonia.

It is moreover known that some alkylenediamidoximes and benzamidoximes are of antitripanosomic (Lamb and White, J. Chem. Soc. 1939, 1253) and antirickettish activity (Andrews, King and Walker, Proc. Roy. Soc. 133 B, 20 (1946)).

Novel amidoximes of the above referred type have now been found, which are of valuable pharmacological activity. The novel compounds according to this invention comprise phenyl-alkyl-amidoximes in which a halogen atom is substituted in the nucleus, of the following general formula:

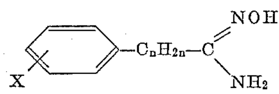

wherein $n$ is an integer between 1 and 4 inclusive, X being a halogen atom.

The invention concerns more particularly $\alpha$-phenyl-acetamidoxime, $\beta$-phenyl-propionamidoxime, $\gamma$-phenyl-butyramidoxime and $\Delta$-phenyl-valeroamidoxime, all of them being substituted in their nucleus in accordance with the above general formula. The halogen may be chlorine, bromine, iodine or fluorine.

The invention further provides a method of preparing the above phenyl-alkyl-amidoximes, essentially comprising the step of reacting a corresponding halogen-phenyl-alkylcyanide (nitrile-) with hydroxylamine hydrochlorate or hydroxylamine salt in the presence of a base in an aqueous or alcoholic or alcoholic-aqueous medium. The base is preferably selected among alkali alcoholates, alkali and earth alkali carbonates and bicarbonates and pyridine without, however, omitting other suitable bases. The halogen-substituted phenyl-alkyl-amidoxime resulting from the above reaction can be isolated as such or in the form of a soluble salt, such as hydrochlorate or hydrobromate.

The starting nitriles employed by the method are known in part from the literature. Isomer $\beta$-(o-bromo)-phenyl-propionitriles as well as halogen-phenyl-butyronitriles and halogen-phenyl-valeronitriles can, however, be prepared along usual general processes, such as by distilling their respective amides with phosphoric anhydride, thionyl chloride and phosphor pentachloride, or by cyaniding

2 their corresponding halogen-derivatives by an alkali cyanide.

Halogen-substituted phenyl-alkyl-amidoximes according to this invention exhibit an unexpectedly marked hypotensive action, which is of an appreciably lasting character, in a fairly small dose. The therapeutical index of these amidoximes decidedly recommends them for pharmacotheraputic use.

The methods of preparing $\alpha$-(o-bromo)-phenyl-acetamidoxime and $\beta$-(o-bromo)-phenyl-propionamidoxime are illustrated by the following examples.

*Example 1.*—26 gr. o-bromo-benzylcyanide and 9.25 gr. hydroxylamine hydrochlorate are added to a solution of 3 gr. sodium in 250 ml. absolute ethanol, the whole being reflux-boiled over a water-bath during two hours and cooled. Separated inorganic salts are filtered off. The filtrate is cooled by means of a refrigerating mixture yielding, a precipitate of o-bromo-phenylacetamide which is removed by filtering. This product is known from the literature, its melting point being 186–187° C.

The alcoholic mother-liquors are evaporated by vacuum distillation (water pump) to a volume of 75 ml., thereupon acidulated to pH=4. The unreacted starting product is extracted by ether, the aqueous solution being neutralised by means of sodium bicarbonate till full precipitation of o-bromo-phenylacetamidoxime, which is isolated by filtering and crystallising from ethanol and isopropyl ether. Output 15 gr.; melting point 128–130° C.

Upon recrystallising from a mixture of ethanol and isopropyl ether the hydrochlorate of this amidoxime is in the form of colorless non-hygroscopic glossy scales which melt at 147–149° C.

*Example 2.*—19 g. o-bromo-phenylpropionamide (Gonzales, Anales fis. y quim. 40, 1182 (1944)) are reflux-heated over a direct flame during an hour and a half with 20 ml. thionyl chloride, while they are protected against moisture by means of a $CaCl_2$ tube, whereupon the mixture is concentrated to a small volume and the residue is taken up with ethyl alcohol. The ethereal solution is washed with an alkali carbonate, then distilled in vacuum while it is protected against moisture. This yields 14 g. o-bromo-phenylpropionitrile, boiling point 149–151° C. at 2 mm. mercury column.

14 g. of the above nitrile and 5 g. hydroxylamine hydrochlorate are dissolved in 150 ml. absolute ethanol and reflux-boiled during two hours, maintaining the pH of the solution at a constantly neutral value by repeated additions of sodium bicarbonate. The method is henceforth carried out substantially as described in Example 1, by cooling the reaction mixture, removing inorganic salts, etc. This yields 10 g. o-bromo-phenylpropionamidoxime, melting point 109–110° C., having the structural formula

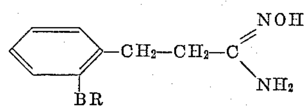

Upon recrystallising from a mixture of ethanol and isopropyl ether the hydrochlorate is in the form of glossy scales and melts and decomposes at 180–182° C.

What I claim is:

1. Halogen-phenyl-alkylamidoxime of the following general formula:

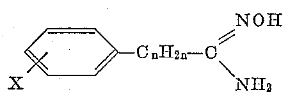

wherein $n$ is an integer between 1 and 4 inclusive, and X is a halogen atom, said halogen atom being a member of the group consisting of chlorine and bromine.

2. α-phenyl-acetamidoxime, substituted by a halogen atom in the ortho position of the nucleus, said halogen atom being a member of the group consisting of chlorine and bromine.

3. β-phenyl-propionamidoxime substituted by a halogen atom in the ortho position of the nucleus, said halogen atom being a member of the group consisting of chlorine and bromine.

References Cited in the file of this patent

UNITED STATES PATENTS

| | | |
|---|---|---|
| 2,387,323 | Gaynor et al. | Oct. 23, 1945 |
| 2,902,514 | De Benneville et al. | Sept. 1, 1959 |
| 2,947,782 | De Benneville et al. | Aug. 2, 1960 |

OTHER REFERENCES

Werner et al.: Ber. Deut. Chem., vol. 32, pp. 1975–1985 (1899).

Merckx: Bull. Soc. Chim. Belges, vol. 58, pp. 58–65 (1949).

Clarke: J. Chem. Soc. (London), vol. of 1954 pp. 4251–4253.

Kuras et al.: C.A., volume 47, page 38188 (1954).